United States Patent
Kim et al.

(10) Patent No.: US 8,483,742 B2
(45) Date of Patent: Jul. 9, 2013

(54) METHOD AND APPARATUS FOR CONTROLLING UPLINK POWER IN A WIRELESS COMMUNICATION SYSTEM

(75) Inventors: Dong Cheol Kim, Suwon-si (KR); Wook Bong Lee, Sungnam-si (KR); Han Gyu Cho, Seoul (KR); Jin Sam Kwak, Gunpo-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 395 days.

(21) Appl. No.: 12/843,413

(22) Filed: Jul. 26, 2010

(65) Prior Publication Data
US 2011/0098076 A1 Apr. 28, 2011

Related U.S. Application Data

(60) Provisional application No. 61/254,210, filed on Oct. 23, 2009.

(30) Foreign Application Priority Data

Mar. 23, 2010 (KR) .................. 10-2010-0025642

(51) Int. Cl.
*H04W 52/04* (2009.01)
(52) U.S. Cl.
USPC .......... 455/522; 455/69; 455/135; 455/222; 455/226.3; 370/329; 370/281; 370/252
(58) Field of Classification Search
USPC .............. 455/69, 522, 67.11, 67.16, 67.13, 455/13.4, 513, 420, 450, 436, 115.1, 135, 455/220, 222, 226.3, 283, 501; 370/329, 370/252, 328, 311, 343, 242, 281; 375/285
See application file for complete search history.

(56) References Cited

U.S. PATENT DOCUMENTS

| | | | |
|---|---|---|---|
| 2003/0040274 A1* | 2/2003 | Dai et al. | 455/13.4 |
| 2007/0189047 A1 | 8/2007 | Lee et al. | |
| 2007/0191050 A1 | 8/2007 | Chang et al. | |
| 2007/0280183 A1 | 12/2007 | Cho et al. | |
| 2008/0008113 A1 | 1/2008 | Cho et al. | |
| 2008/0220806 A1* | 9/2008 | Shin et al. | 455/522 |
| 2010/0081469 A1* | 4/2010 | Kazmi et al. | 455/522 |
| 2010/0113077 A1* | 5/2010 | Lee et al. | 455/501 |
| 2011/0002279 A1* | 1/2011 | Yang et al. | 370/329 |
| 2011/0026419 A1* | 2/2011 | Kim et al. | 370/252 |
| 2011/0103241 A1* | 5/2011 | Cho et al. | 370/252 |
| 2011/0117953 A1* | 5/2011 | Kim et al. | 455/522 |
| 2011/0199945 A1* | 8/2011 | Chang et al. | 370/281 |
| 2011/0199990 A1* | 8/2011 | Chang et al. | 370/329 |
| 2012/0064936 A1* | 3/2012 | Vrzic et al. | 455/522 |

* cited by examiner

*Primary Examiner* — Tan Trinh
(74) *Attorney, Agent, or Firm* — Birch, Stewart, Kolasch & Birch, LLP

(57) ABSTRACT

A method and apparatus for controlling uplink power in a wireless communication system are disclosed. The uplink power controlling method includes receiving target Signal-to-Interference plus Noise Ratio (SINR) parameters and an uplink noise and interference level from a base station, determining an uplink power based on a target SINR and an estimated average power level of noise and interference of a user equipment, the target SINR being determined using the target SINR parameters and the estimated average power level of noise and interference of the user equipment being calculated using the uplink noise and interference level, and receiving at least one of selectively transmitted first and second offsets from the base station and adjusting the uplink power based on the received at least one of the first and second offsets.

20 Claims, 8 Drawing Sheets

METHOD AND APPARATUS FOR CONTROLLING UPLINK POWER IN A WIRELESS COMMUNICATION SYSTEM

CROSS-REFERENCE TO RELATED APPLICATIONS

This application claims the benefit of the Korean Patent Application No. 10-2010-0025642, filed on Mar. 23, 2010, which is hereby incorporated by reference as if fully set forth herein.

This application also claims the benefit of U.S. Provisional Application Ser. No. 61/254,210 filed on Oct. 23, 2009, the content of which is hereby incorporated by reference herein its entirety.

BACKGROUND OF THE INVENTION

1. Field of the Invention

The present invention relates to wireless communication, and more particularly, to a method for controlling transmission power to stably transmit data or control information to a Base Station (BS).

2. Background Art

Future-generation multimedia wireless communication systems, which are a recent active research area, require processing of various types of information including video data and wireless data at high data rates, beyond the traditional voice-oriented service.

Owing to its advantage of high data rate, Orthogonal Frequency Division Multiplexing (OFDM) has recently attracted much attention. OFDM is a special case of Multi-Carrier Modulation (MCM) in which a frequency band is divided into multiple orthogonal subcarriers and data is transmitted on the subcarriers. The low complexity of OFDM reduces inter-symbol interference. In OFDM, an input serial sequence of data symbols is converted to N parallel data symbols and transmitted on N separate subcarriers.

Orthogonality is maintained among the subcarriers in the frequency domain. Each orthogonal channel experiences mutually independent frequency-selective fading and the resulting increase in the gap between transmitted symbols leads to minimum inter-symbol interference. Orthogonal Frequency Division Multiple Access (OFDMA) is a multiple access scheme in which multiple accesses are allowed through independent allocation of part of available subcarriers to each user in an OFDM system. In OFDMA, it is typical to independently allocate frequency resources, namely subcarriers to a plurality of users in such a manner that the frequency resources are not overlapped with one another. As a result, allocation of frequency resources is mutually exclusive among users in OFDMA.

For an efficient system configuration, a wireless communication system is designed to be cellular. A cell is defined as a smaller area divided from a larger area to efficiently use frequency. In general, a BS is deployed at a cell center to communicate with User Equipments (UEs). A cell is the coverage area of a BS.

The wireless communication system adopts a power control scheme as one of ways to reduce path loss that depends on the distance between a BS and a UE and inter-cell interference from neighbor cells. According to the power control scheme, the transmission power of data is controlled to be low enough to maintain Quality of Service (QoS) at a certain level. Especially UEs at a cell edge are greatly affected by path loss and inter-cell interference in a multi-cell environment. A UE should transmit data at an appropriate transmission power level that does not decrease QoS according to path loss without causing interference to neighbor cells.

Accordingly, the UE determines its transmission power based on path loss, inter-cell interference, and a target Signal-to-Interference plus Noise Ratio (SINR) for data transmission. For the determination of the transmission power, the UE also considers UE-controlled UE-specific power correction and BS-controlled UE-specific power correction. The UE calculates the target SINR using target SINR parameters received from the BS. How to determine the target SINR depends on an operation mode. In Mode 1, the UE determines the target SINR based on a number of control factors that are received from the BS for use in controlling a total system throughput, a trade-off between operations at a cell edge, and an Interference plus noise over Thermal noise (IoT), whereas in Mode 2 the UE determines the target SINR based on a Carrier-to-Noise Ratio (C/N) shared between the BS and the UE for each transmission channel on which the UE transmits data and/or control information to the BS. The problem of the UE's complexity has been brought up from the method for determining a target SINR differently for different modes. Especially in Mode 2, the C/N used in determining the target SINR is determined based on the offset of each piece of information, $I_{offset}$. Considering this information offset reflects a resource size that varies with a Modulation and Coding Scheme (MCS) level or a channel status different even for the same information, the determination of the C/N of each transmission channel is very complicated and difficult.

The UE adjusts its transmission power using a UE-determined UE power offset as well as a UE power offset received from the BS. Because the channel environment of the UE changes very fast, power control based on UE-transmitted feedback information may adversely affect the stability of the channel environment of the wireless communication system.

Accordingly, there exists a need for a method for determining transmission power so as to maintain the stability of the channel environment of a wireless communication system, while simplifying the process of determining transmission power at a UE.

DISCLOSURE

Technical Problem

An object of the present invention devised to solve the problem lies on a method and apparatus for controlling power so as to simplify a UE's process of determining transmission power and maintain the channel environment of a wireless communication system stable.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

BRIEF SUMMARY OF THE INVENTION

The object of the present invention can be achieved by providing a method for controlling uplink power in a wireless communication system, which includes receiving target SINR parameters and an uplink noise and interference level from a base station, determining an uplink power based on a target SINR and an estimated average power level of noise and interference of a user equipment, the target SINR being determined using the target SINR parameters and the estimated average power level of noise and interference of the user equipment being calculated using the uplink noise and interference level, and receiving at least one of selectively transmitted first and second offsets from the base station and adjusting the uplink power based on the received at least one of the first and second offsets.

In another aspect of the present invention, provided herein is an apparatus for controlling uplink power in a wireless communication system, including a receiver for receiving data from a base station, and a processor for controlling the receiver to receive the data. The receiver receives target SINR parameters and an uplink noise and interference level from the base station and receives at least one of selectively transmitted first and second offsets from the base station. The processor determines an uplink power based on a target SINR and an estimated average power level of noise and interference of a user equipment, the target SINR being determined using the target SINR parameters and the estimated average power level of noise and interference of the user equipment being calculated using the uplink noise and interference level and adjusts the uplink power based on the received at least one of the first and second offsets.

In another aspect of the present invention, provided herein is a method for controlling uplink power in a wireless communication system, including broadcasting target SINR parameters and an uplink noise and interference level, and unicasting first and second offsets selectively to a user equipment, for adjusting an uplink power of the user equipment.

In a further aspect of the present invention, provided herein is an apparatus for controlling uplink power in a wireless communication system, including a transmitter for transmitting data, and a processor for controlling the transmitter to broadcast target SINR parameters and an uplink noise and interference level to unicast first and second offsets selectively to a user equipment, for adjusting an uplink power of the user equipment.

The base station may transmit the first offset and the second offset independently to the user equipment.

The first offset may be set a value ranging from '−X1 (dB)' smaller than −0.5 dB to 'X2 (dB)' larger than 1.0 dB. For example, the first offset may be a value ranging from −15.5 dB to 16 dB with a quantization interval of 0.5 dB. The second offset may be one of −0.5 dB, 0.0 dB, 0.5 dB and 1.0 dB.

The uplink power may be determined by the following equation, $$P \text{ (dBm)} = L + SINR_{Target} + NI + \text{Offset}$$

where P denotes the uplink power, L denotes a current estimated average downlink propagation loss, $SINR_{Target}$ denotes the target SINR, NI denotes the estimated average power level of noise and interference of the user equipment, and Offset is initially set to '0'.

The uplink power may be adjusted to a new uplink power by the following equation, $$P_{new} \text{ (dBm)} = L + SINR_{Target} + NI + \text{Offset}$$

where $P_{new}$ denotes the new uplink power and Offset is one of the first and second offsets.

A target SINR for a data channel may be determined by the following equation, $$SINR_{Target} = 10\log10\left(\max\left(10^{\left(\frac{SINR_{MIN}(dB)}{10}\right)}, \gamma_{IoT} \times SIR_{DL} - \alpha\right)\right) - \beta \times 10\log10(TNS)$$

where $SINR_{Target}$ denotes the target SINR for the data channel, $SINR_{MIN}$ denotes an SINR requirement for a minimum rate expected by the base station, $\gamma_{IoT}$ denotes a fairness and IoT control factor, $SIR_{DL}$ denotes a ratio of a downlink signal to interference power, measured by the use equipment, α denotes a factor based on the number of reception antennas of the base station, and β denotes a stream factor indicating whether a Total Number of Streams (TNS) is applied, and a target SINR for each of a Hybrid Automatic Repeat reQuest (HARQ) channel, a synchronized ranging channel, a Primary Fast Feedback CHannel (P-FBCH), a Secondary Fast Feedback CHannel (S-FBCH), and a bandwidth request channel may be determined based on a target SINR for the channel, received from the base station.

ADVANTAGEOUS EFFECTS

The present invention can improve the QoS of a wireless communication system by maintaining the stability of the channel environment of the wireless communication system, while facilitating a UE to determine uplink power in the wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the preferred embodiments of the present invention, examples of which are illustrated in the accompanying drawings.

Figure 1:
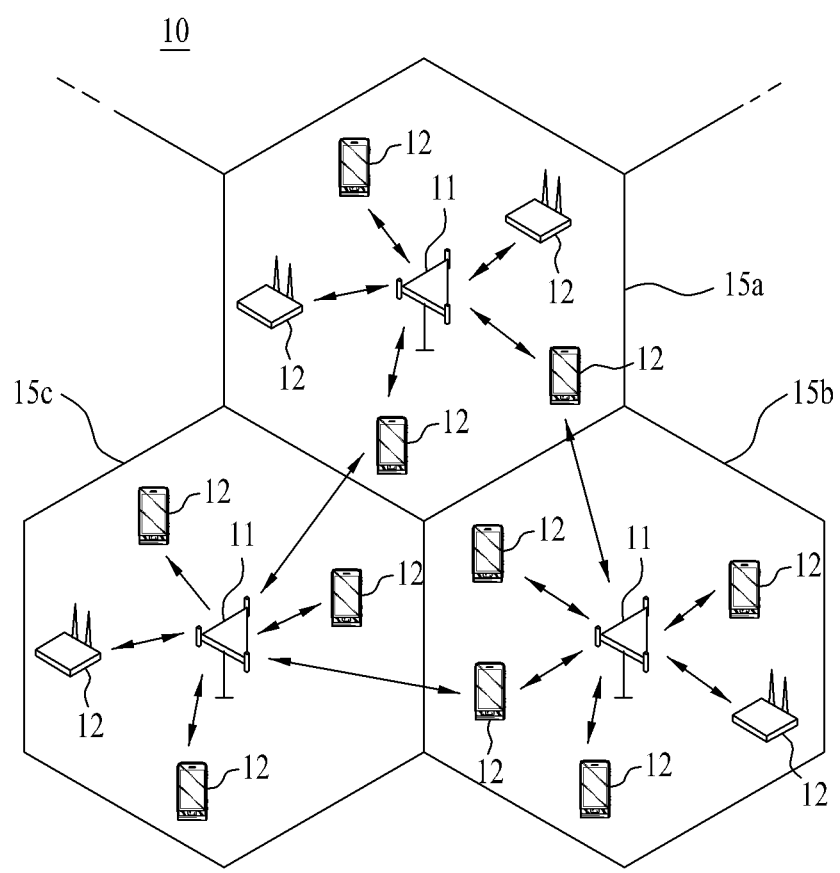
FIG. 1 is a block diagram of a wireless communication system.

FIG. 1 is a block diagram of a wireless communication system.

Referring to FIG. 1, a wireless communication system 10 includes at least one Base Station (BS) 11. Each BS 11 provides communication service to User Equipments (UEs) 12 within a specific geographical area (generally called a cell) 15a, 15b or 15c covered by the BS 11. The cell may be further divided into a plurality of areas called sectors. The UEs 12 may be mobile or fixed devices that transmit and receive user data and/or control information to and from the BS 11. The term "UE" is interchangeable with the terms "Mobile Station (MS)", "Mobile Terminal (MT)", "User Terminal (UT)", "Subscriber Station (SS)", "wireless device", "Personal Digital Assistant (PDA)", "wireless modem", "handheld device", etc. The BS 11 is usually a fixed station that communicates with the UEs 12 and/or another BS 11. Thus, the BS 11 exchanges data and control information with the UEs 12 and/or another BS 11. The term "BS" is used interchangeably with the terms "evolved Node B (eNB)", "Base Transceiver System (BTS)", "Access Point (AP)", etc.

A downlink refers to a communication link directed from a BS 11 to a UE 12 and an uplink refers to a communication link directed from a UE 12 to a BS 11. A transmitting device is a fixed and/or mobile node for providing data service or voice service and a receiving device is a fixed and/or mobile node that receives data service or voice service. The transmitting device may be part of the BS 11 and the receiving device may be part of the UE 12, on the downlink, whereas the transmitting device may be part of the UE 12 and the receiving device may be part of the BS 11, on the uplink.

A wireless communication system to which the present invention is applied is not limited to any particular multiple access scheme. Thus, a variety of multiple access schemes are available to the wireless communication system, such as Code Division Multiple Access (CDMA), Time Division Multiple Access (TDMA), Frequency Division Multiple Access (FDMA), Single-Carrier FDMA (SC-FDMA), and Orthogonal Frequency Division Multiple Access (OFDMA).

Figure 2:
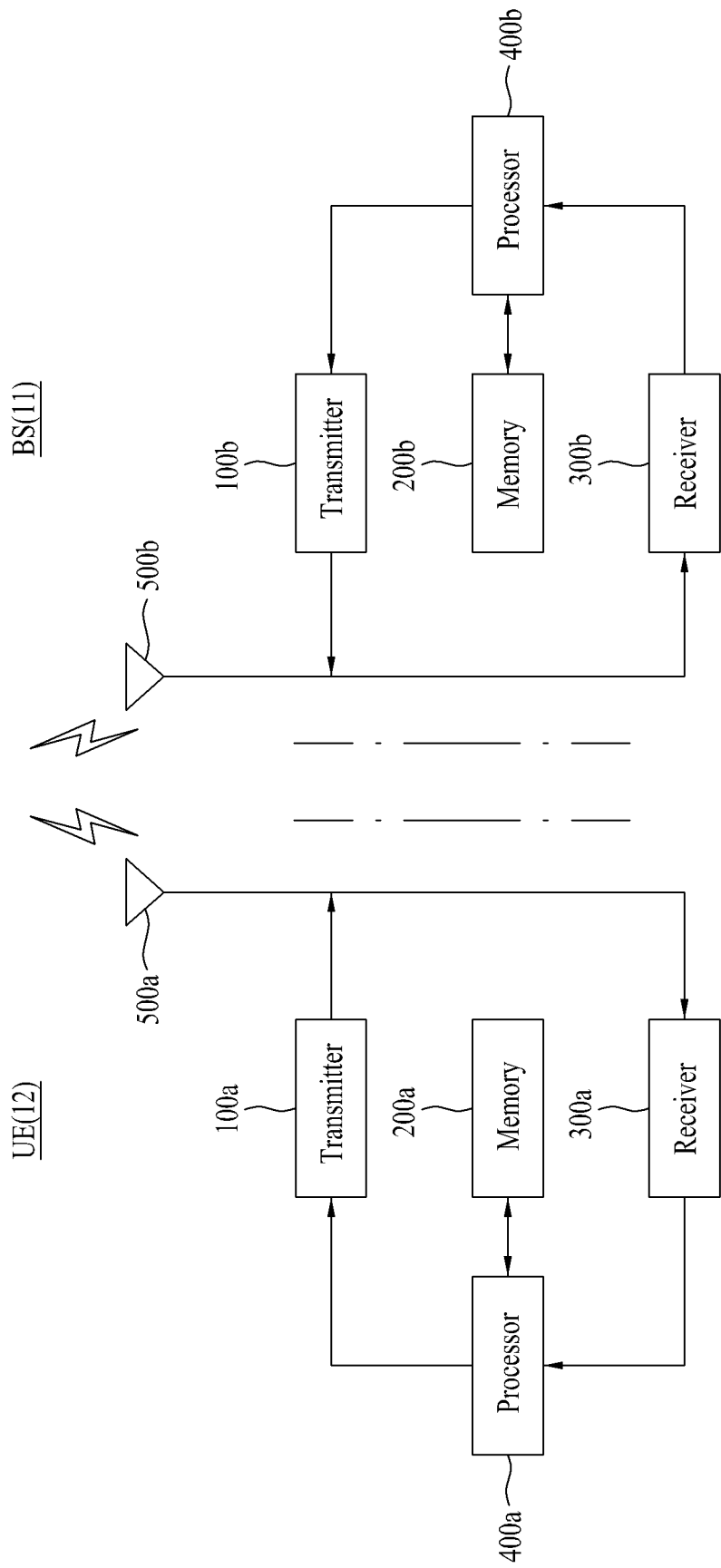
FIG. 2 is a block diagram of a User Equipment (UE) and a Base Station (BS) for implementing the present invention.

FIG. 2 is a block diagram of a UE 12 and a BS 11 for implementing the present invention.

As stated before, the UE 12 serves as a transmitting device on the uplink and as a receiving device on the downlink. The BS 11 may serve as a receiver on the uplink and as a transmitting device on the downlink.

The UE 12 and the BS 11 include antennas 500a and 500b for transmitting and receiving information, data, signals, and/or messages, transmitters 100a and 100b for transmitting messages through the antennas 500a and 500b, receivers 300a and 300b for receiving messages through the antennas 500a and 500b, and memories 200a and 200b for storing information associated with communication in the wireless communication system. The UE 12 and the BS 11 further include processors 400a and 400b, respectively, which are adapted to perform the present invention by controlling the components of the UE 12 and the BS 11 including the transmitters 100a and 100b, the receivers 300a and 300b, and the memories 200a and 200b. The transmitter 100a, the memory 200a, the receiver 300a, and the processor 400a may be configured as independent components on separate chips or their separate chips may be incorporated into a single chip in the UE 12. Likewise, the transmitter 100b, the memory 200b, the receiver 300b, and the processor 400b may be configured as independent components on separate chips or their separate chips may be incorporated into a single chip in the BS 11.

The antennas 500a and 500b transmit signals generated from the transmitters 100a and 100b over the air, or output external wireless signals received over the air to the receivers 300a and 300b. If the transmitters 100a and 100b and the receivers 300a and 300b are implemented into transmission and reception modules that support Multiple Input Multiple Output (MIMO) using a plurality of antennas, each of them may be connected to two or more antennas.

The processors 400a and 400b generally provide overall control to the modules of the UE 12 and the BS 11. Especially, the processors 400a and 400b may carry out a control function for performing the present invention, a Medium Access Control (MAC) frame conversion control function based on service characteristics and a propagation environment, a power saving function for controlling idle-mode operations, a handover function, and an authentication and encryption function. The processors 400a and 400b may also be called controllers, microcontrollers, microprocessors, microcomputers, etc. The processors 400a and 400b may be achieved by hardware, firmware, software, or a combination thereof. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), processors. In a firmware or software configuration, firmware or software may be configured to include a module, a procedure, a function, etc. performing functions or operations of the present invention. This firmware or software may be provided in the processors 400a and 400b, or may be stored in the memories 200a and 200b and invoked from the memories 200a and 200b by the processors 400a and 400b.

The transmitters 100a and 100b encode and modulate transmission signals and/or data scheduled by the processors 400a and 400b in a predetermined coding and modulation scheme and transmit the modulated signals and/or data through the antennas 500a and 500b. In addition, the transmitters 100a and 100b convert a transmission data stream to K signal streams by demultiplexing, channel coding, modulation, etc. The K signal streams are transmitted through the antennas 500a and 500b after being processed in transmission processors of the transmitters 100a and 100b.

Figure 3:
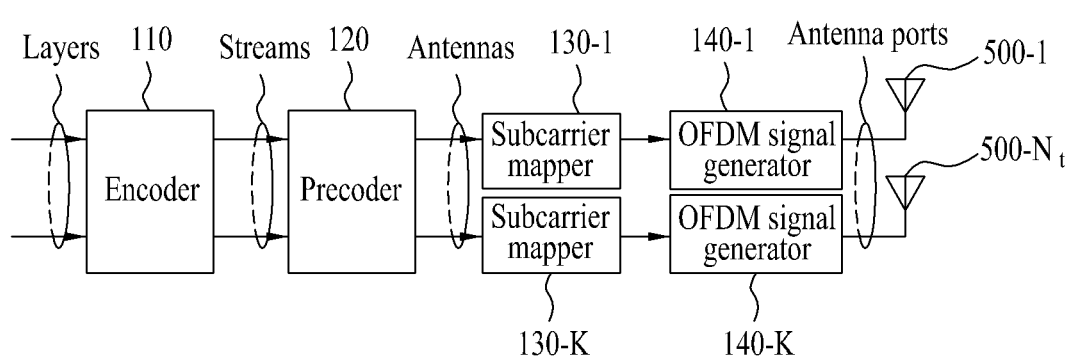
FIG. 3 is an exemplary block diagram of a transmitter in each of the UE and the BS.

FIG. 3 is an exemplary block diagram of a transmitter in each of the UE and the BS. With reference to FIG. 3, operations of the transmitters 100a and 100b will be described below in great detail.

Referring to FIG. 3, each of the transmitters 100a and 100b includes an encoder 110, a precoder 120, subcarrier mappers 130-1 to 130-K, Orthogonal Frequency Division Multiplexing (OFDM) signal generators 140-1 to 140-K, and $N_t$ transmission antennas 500-1 to 500-$N_t$.

The encoder 110 encodes a transmission data stream to coded data in a predetermined coding scheme and modulates the coded data to symbols representing positions on a signal constellation in a predetermined modulation scheme. The modulation scheme may be, but not limited to, any of m-Phase Shift Keying (m-PKS) and m-Quadrature Amplitude Modulation (m-QAM). For modulating the coded data, the encoder 110 may have an independent modulation module. In the mean time, the encoder 110 may define the layers of the input symbols such that the precoder 120 can distribute antenna-specific symbols to predetermined antenna paths. A layer refers to an information path leading to the precoder 120 and the information path before the precoder 120 may be referred to as a virtual antenna or layer. To define the layers of the symbols, the encoder 110 may be provided with a layer mapper configured as an independent module.

The precoder 120 processes the received symbols according to a MIMO scheme involving the transmission antennas 500-1 to 500-N$_t$ and thus outputs antenna-specific symbols to the subcarrier mappers 130-1 to 130-K.

The subcarrier mappers 130-1 to 130-K allocate the antenna-specific symbols to appropriate subcarriers and multiplex them according to users. The OFDM signal generators 140-1 to 140-K output OFDM symbols by subjecting the antenna-specific symbols to OFDM modulation. The OFDM signal generators 140-1 to 140-K may perform Inverse Fast Fourier Transform (IFFT) on the antenna-specific symbols and insert a Cyclic Prefix (CP) into the resulting IFFT time-domain symbol. The OFDM symbol is transmitted through the transmission antennas 500-1 to 500-N$_t$.

The receivers 300a and 300b decode and demodulate wireless signals received through the antennas 500a and 500b over the air and output the demodulated signals to the processors 400a and 400b. The antenna 500a or 500b connected to each of the receivers 300a and 300b may include N reception antennas. Signals received through the respective reception antennas are downconverted to baseband signals and recovered to an original data stream that the transmitter 100a or 100b transmitted, after multiplexing and channel demodulation. Therefore, each of the receivers 300a and 300b may have a signal recoverer for downconverting received signals to baseband signals, a multiplexer for multiplexing the baseband signals, and a channel demodulator for demodulating the multiplexed signal stream to a data stream. The signal recoverer, the multiplexer, and the channel demodulator may be configured as separate modules or incorporated into a single module.

In a MIMO system, the transmitters 100a and 100b may operate in two modes, that is, Single CodeWord (SCW) mode and Multi-CodeWord (MCW) mode depending on how many coded packets are converted to a plurality of signal streams. One codeword is transmitted through a plurality of layers irrespective of the number of layers in the SCW mode, whereas one codeword is transmitted through each of a plurality of layers in the MCW mode. As a receiver determines for each codeword whether the codeword is successfully demodulated, using the Cyclic Redundancy Check (CRC) of the codeword in the MCW mode, the receiver may achieve an additional gain by a reception process such as interference cancellation. Therefore, each of the receivers 300a and 300b may further include an interference canceller for cancelling interference in addition to the demodulation, channel decoding and multiplexing modules, if it operates in the MCW mode.

The memories 200a and 200b may store programs required for signal processing and controlling of the processors 400a and 400b and temporarily store input and output information. The memory 200a of the UE 12 may store, for example, parameters received from the BS 12 for use in determining uplink power. The memories 200a and 200b each may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

Now a description will be made of uplink power control methods.

Uplink power control is supported for both initial calibration and periodic control of transmission power without loss of data. An uplink power control algorithm determines the transmission power of each symbol to compensate for path loss, shadowing, and fast fading. Also, uplink power control is intended to control an inter-cell interference level.

For power control, there are largely two schemes, Open Loop Power Control (OLPC) and Closed Loop Power Control (CLPC). CLPC is a power control scheme in which the transmission power of the UE 12 is increased or decreased according to a direct power increase/decrease message received from the BS 11. Compared to CLPC, OLPC is a power control scheme in which the UE 12 determines its transmission power on its own based on parameters received from the BS 11, instead of the direct power increase/decrease command from the BS 11. For example, the BS 11 transmits power control information to the UE 12 and the UE 12 then controls its uplink power based on the power control information.

Figure 4:
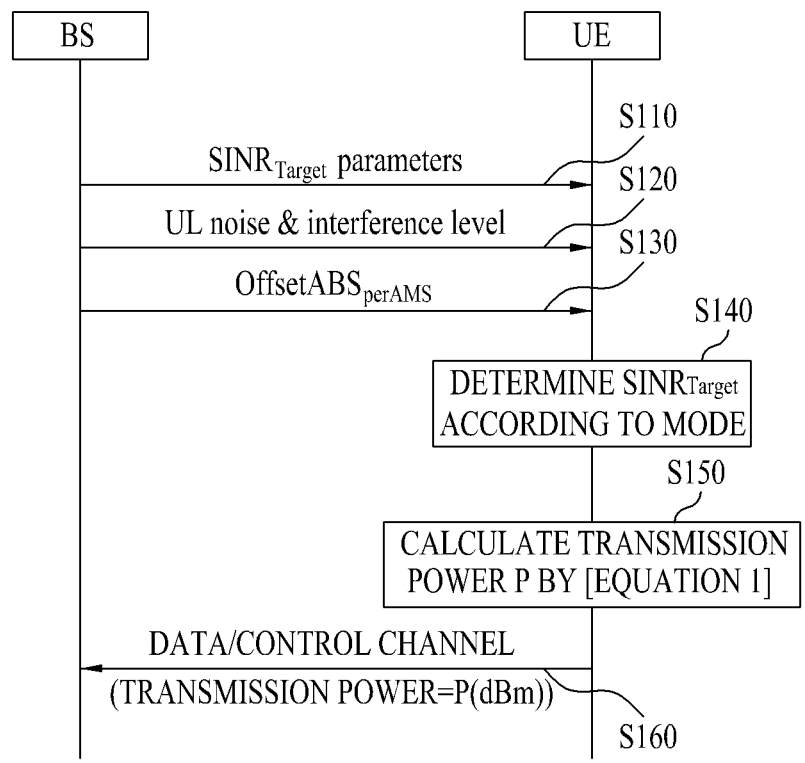
FIG. 4 is a diagram illustrating a signal flow for a method for controlling uplink power according to an embodiment of the present invention.

FIG. 4 is a diagram illustrating a signal flow for a method for controlling uplink power according to an embodiment of the present invention.

Referring to FIG. 4, the BS transmits to the UE uplink power control information including parameters required for determining a target SINR SINR$_{Target}$ (hereinafter, referred to as target SINR parameters), an uplink noise and interference level, and a UE-specific power offset OffsetABS$_{perAMS}$ in steps S110, S120 and S130. The UE performs an uplink power control based on the power control information. Specifically, the UE may determine a power per subcarrier and per transmission antenna, or power per subcarrier and per stream by the following equation.

$$P \text{ (dBm)} = L + \text{SINR}_{Target} + \text{NI} + \text{OffsetAMS}_{perAMS} + \text{OffsetABS}_{perAMS} \quad \text{[Equation 1]}$$

where L denotes an estimated average downlink propagation loss calculated at a given time by the UE, including a transmission antenna gain and path loss of the UE. The UE may calculate the downlink propagation loss L based on the total power of active subcarriers carrying a frame preamble. Additionally, the UE may calculate the downlink propagation loss L using another downlink reference signal. Besides, many other methods are available to calculate the downlink propagation loss L. SINR$_{Target}$ denotes a target SINR for the UE. The target SINR may be signaled to the UE by the BS, or information about a mode and parameters required for determining the target SINR may be transmitted to the UE in the power control information by the BS. Or a predetermined value may be used as SINR$_{Target}$. The UE determines the target SINR using the information about the mode and parameters signaled by the BS according to [Equation 3]. NI denotes an estimated average power level (dBm) of noise and interference per subcarrier at the BS, which is transformed by [Equation 2] from an IoT level broadcast from the BS.

$$\text{NI} = P_{TN} + IoT + 10 \log 10(\Delta f) \quad \text{[Equation 2]}$$

where P$_{TN}$ denotes a thermal noise power density at 0□, Δf denotes a subcarrier spacing, and IoT denotes the uplink noise and interference level broadcast to UEs within the coverage area of the BS by the BS, ranging from 0 dB to 63.5 dB with a quantization interval of 0.5 dB.

In [Equation 1], OffsetAMS$_{perAMS}$ denotes a UE-specific power offset determined by the UE and OffsetABS$_{perAMS}$ denotes a UE-specific power offset determined and unicast to the UE by the BS.

Upon receipt of the power control information from the BS, the UE determines a target SINR by the following equation in step S140.

$$SINR_{Target} = \begin{cases} 10\log10\left(\max\left(10^{\left(\frac{SINR_{MIN}(dB)}{10}\right)}, \gamma_{IoT} \times SIR_{DL} - \alpha\right)\right) - \beta \times 10\log10(TNS), & \text{OLPD mode 1} \\ C/N, & \text{OLPD mode 2} \end{cases}$$ [Equation 3]

where OLPC mode 1 is a mode of calculating the target SINR to control a total system throughput, a trade-off between operations at a cell edge, and an IoT. $SINR_{MIN}$ (dB) denotes a SINR requirement for a minimum rate expected by the BS, that is, a minimum SINR required to improve the performance of a UE at a cell edge, and $\gamma_{IoT}$ is a fairness and IoT control factor. $SIR_{DL}$ is a ratio of a downlink signal to interference power, measured by the UE. $\alpha$ is a factor based on the number of reception antennas of the BS, signaled by MAC power control signaling, and $\beta$ is a stream factor indicating whether Total Number of Streams (TNS) is applied or not, determined and transmitted by the BS. TNS denotes the total number of streams in a Logical Resource Unit (LRU) indicated by uplink MAP information. TNS may be unicast to the UE by the BS. In OLPC mode 1, $SINR_{MIN}$, $\gamma_{IoT}$, $\alpha$, and $\beta$ required for determining the target SINR may be broadcast or unicast to the UE by the BS.

In OLPC mode 2, a target SINR is determined based on a C/N shared between the UE and the BS or a required SINR. The C/N is a normalized carrier-to-noise ratio of modulation/Forward Error Correction (FEC) for a current transmission.

The UE calculates a transmission power level per stream and subcarrier (dBm), P, using the downlink propagation loss L, the target SINR, the estimated average power level of noise and interference per subcarrier NI, the UE-specific offset determined by the UE OffsetAMS$_{perAMS}$, and the UE-specific offset determined by the BS OffsetABS$_{perAMS}$ in step S150 and transmits streams or subcarriers with the transmission power P to the BS in step S160.

In OLPC mode 2, a different C/N value is required for different transmission information. Even for the same information, a required resource size varies according to channel status. Therefore, it is more and more difficult to determine a C/N for each piece of transmission information and share the C/N between the UE and the BS. Moreover, determining a target SINR according to a mode makes the uplink power determination of the UE complicated.

OffsetAMS$_{perAMS}$ and OffsetABS$_{perAMS}$ are factors used to change the power of an individual UE to achieve the overall stability of the wireless communication system 10. OffsetAMS$_{perAMS}$ is determined by the UE, for use in power control. The individual UE's independent adjustment of its uplink power level may adversely affect the overall stability of the wireless communication system 10.

With reference to FIGS. 5 to 8, a description will be made of embodiments of the present invention for eliminating the adverse effects of a UE-determined power offset on power control, while overcoming the shortcomings of the uplink power calculation based on a target SINR that is differently calculated according to a mode, illustrated in FIG. 4.

Figure 5:
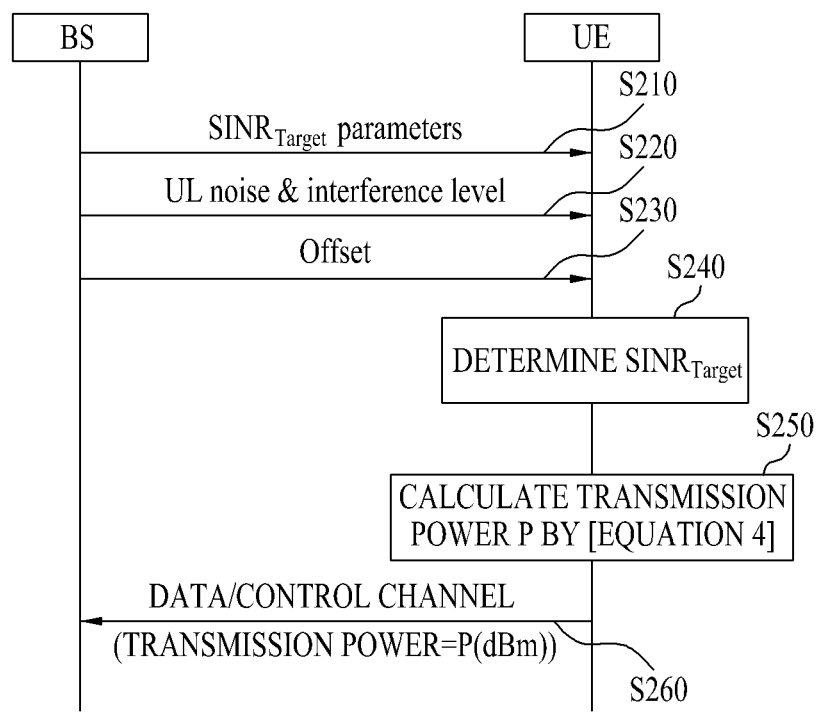
FIG. 5 is a diagram illustrating a signal flow for a method for controlling uplink power according to another embodiment of the present invention.

FIG. 5 is a diagram illustrating a signal flow for a method for controlling uplink power according to another embodiment of the present invention.

Referring to FIG. 5, the BS transmits to the UE uplink power control information including target SINR parameters, an uplink noise and interference level, and a UE-specific power offset in steps S210, S220 and S230. The UE performs an uplink power control based on the received uplink power control information. Specifically, the UE determines a power per subcarrier and per transmission antenna, or a power per subcarrier and per stream by the following equation.

$$P \text{ (dBm)} = L + SINR_{Target} + NI + \text{Offset}$$ [Equation 4]

where L denotes an estimated average downlink propagation loss calculated at a given time by the UE and NI denotes an estimated average power level (dBm) of noise and interference per subcarrier, as described before with reference to [Equation 1] and [Equation 2].

$SINR_{Target}$ denotes a target SINR for the UE. The BS may signal the target SINR or target SINR parameters required to calculate the target SINR to the UE. In step S240, the UE calculates the target SINR, $SINR_{Target}$, irrespective of modes by [Equation 5], based on the target SINR parameters received from the BS, $SINR_{MIN}$, $\gamma_{IoT}$, $\alpha$ and $\beta$, and a UE-measured $SIR_{DL}$.

$$SINR_{Target} = \\ 10\log10\left(\max\left(10^{\left(\frac{SINR_{MIN}(dB)}{10}\right)}, \gamma_{IoT} \times SIR_{DL} - \alpha\right)\right) - \\ \beta \times 10\log10(TNS)$$ [Equation 5]

In [Equation 4], Offset is a UE-specific power offset determined and transmitted to the UE by the BS. There are two kinds of offset values for a data channel and a control channel as UE-specific power offsets.

The BS may accurately measure the power of a signal received from the UE, generate a power offset by comparing the power of the received signal with a reference power level, and transmit the power offset to the UE. For example, if the SINR of a signal received from the UE is higher than a target SINR, the BS may generate a power offset by which to decrease the transmission power of the UE. On the contrary, if the SINR of the received is lower than the target SINR, the BS may generate a power offset by which to increase the transmission power of the UE.

When the environment of the wireless communication system changes due to an increase or decrease in inter-cell interference, the mobility of UEs within cells, a change in the numbers of UEs within the cells, and a temperature and weather-caused change in the physical environment of the cells, it is necessary to increase or decrease the transmission power of UEs in order to maintain the stability of communication quality in the wireless communication system. Accordingly, the BS may generate a power offset for a UE, taking into account the change of the environment of the wireless communication system.

Data that a UE transmits to a BS may include user data and/or control information. The control information may include various types of information such as an ACKnowledgment/Negative ACKnowledgment (ACK/NACK) signal, a Channel Quality Indicator (CQI), a Precoding Matrix Index (PMI), a Rank Indication (RI), a bandwidth request signal, a scheduling signal, a sounding signal, etc. The ACK/NACK signal is a response to a downlink data transmission. The CQI, which represents a downlink channel quality, may be expressed as an SINR, an MCS level; a data rate indicator, or a Received Signal Strength Indicator (RSSI). The PMI and RI are respectively precoding information and rank information of a MIMO system using a plurality of transmission and reception antennas. Total radio resources may be divided into data regions for carrying user data and/or control information and control regions for carrying control information. A data region with the same permutation is referred to as a data channel and a control region with the same permutation is referred to as a control channel. One data channel may deliver user data of a single or multiple users and one control channel may deliver control information about a single or multiple users. The data channel and the control channel may occupy different frequency areas and/or different time areas. The BS may generate power offsets for specific data and control channels, separately and transmit them to the UE. Table 1 below illustrates an example of power offsets transmitted to the UE.

TABLE 1

| Parameters | Note |
| --- | --- |
| $Offset_{Data}$ | power offset for data channel |
| $Offset_{Control}$ | power offset for control channel |

Referring to Table 1, $Offset_{Data}$ represents a power offset value (or a power offset level) for a data channel. A particular power level that increases or decreases stepwise by 0.5 dB is set as the data channel power offset. Alternatively or additionally, the data channel power offset may be set using a first offset and a second offset by [Equation 6]. The first power offset specifies a relatively large power correction value and the second offset changes by a small unit value.

$$Offset_{Data\_new} = Offset_{Data} + \Delta PowerAdjust \quad \text{[Equation 6]}$$

The BS may signal the first offset $Offset_{Data}$ and the second offset $\square_{PowerAdjust}$ together or separately to the UE. It may be also contemplated that only one of the first offset $Offset_{Data}$ and the second offset $\square_{PowerAdjust}$ is signaled to the UE. The first offset $Offset_{Data}$ may be transmitted when the difference between the SINR of a data signal received from the UE and a target SINR is wide or a great change has occurred to a data channel transmission environment. The second offset $\square_{PowerAdjust}$ may be transmitted when the difference between the SINR of the data signal and the target SINR is narrow or there is a slight change in the data channel transmission environment. The first offset $Offset_{Data}$ and the second offset $\square_{PowerAdjust}$ may be signaled to the UE in different transmission periods. For example, the second offset $\square_{PowerAdjust}$ may be signaled in a relatively short period to thereby reflect a slight change in the wireless communication system in determining the transmission power of the data channel and thus maintain the overall wireless communication environment stable.

$Offset_{control}$ represents a power offset value (or a power offset level) for a control channel. A particular power level that increases or decreases stepwise by 0.5 dB is set as the control channel power offset. Alternatively or additionally, the control channel power offset may be set using a first offset and a second offset by [Equation 7]. The first offset specifies a relatively large power correction value and the second offset changes by a small unit value.

$$Offset_{Control\_new} = Offset_{Control} + \Delta PowerAdjust \quad \text{[Equation 7]}$$

The BS may signal the first offset $Offset_{Control}$ and the second offset $\square_{PowerAdjust}$ together or separately to the UE. It may be also contemplated that only one of the first offset $Offset_{Control}$ and the second offset $\square_{PowerAdjust}$ is signaled to the UE. The first offset $Offset_{Control}$ may be transmitted when the difference between the SINR of a data signal received from the UE and a target SINR is wide or a great change has occurred to a data channel transmission environment. The second offset $\square_{PowerAdjust}$ may be transmitted when the difference between the SINR of the data signal and the target SINR is narrow or there is a slight change in the data channel transmission environment. For example, the second offset $\square_{PowerAdjust}$ may be signaled in a relatively short period to thereby reflect a slight change in the wireless communication system in determining the transmission power of the data channel and thus maintain the overall wireless communication environment stable.

In step S250, the UE determines the uplink power P of a data channel/control channel according to the current downlink propagation loss L, the estimated average power level of noise and interference per subcarrier NI, indicated by the BS, the UE-determined target SINR, and the data channel/control channel power offset (the first offset and/or the second offset) received from the BS, by [Equation 4]. The UE then transmits subcarriers or streams of the data channel/control channel with the determined power P on to the BS in step S260.

The first offset for the data channel or the control channel may be transmitted to the UE by an independent power adjustment message (first-type power adjustment information). For example, the first offset may be delivered to the UE by an Advanced Air Interface Uplink Power Adjust (AAI_UL_POWER_ADJUST) message in compliance with Institute of Electrical and Electronics Engineers (IEEE) 802.16m. The power adjustment message (the first-type power adjustment information) may be configured to indicate a value ranging from '−X1 (dB)' smaller than −'0.5 dB' to 'X2 (dB)' larger than '1.0 dB'. For example, the second offset may be set to a value ranging from '−15.5 dB' to '16 dB' with a quantization interval of 0.5 dB. Meanwhile, the second offset may be set to one of the values listed in Table 2 and transmitted to the UE in the form of independent information (second-type power adjustment information). According to the IEEE 802.16m standard, for example, the second offset may be set to one of the offset values listed in Table 2 and transmitted to the UE by a Power Control Advanced MAP (PC-A-MAP).

TABLE 2

| Power Correction Value | Offset (dB) |
| --- | --- |
| 0b00 | −0.5 |
| 0b01 | 0.0 |
| 0b10 | 0.5 |
| 0b11 | 1.0 |

For the convenience' sake of description, embodiments illustrated in FIGS. 5 to 8 will be described on the assumption that each time a new second offset is received, the new second offset substitutes for an old second offset $\Delta_{PowerAdjust}$. It is also possible to define the second offset. $\Delta_{PowerAdjust}$ as the accumulation of received second offsets. Or in the absence of a second offset, if a new first offset is received, the new first offset may substitute for the old first offset. Also, the old first offset may be defined as the accumulation of new first offsets. Accordingly, [Equation 6] and [Equation 7] may be defined so as to describe the accumulations of the first offsets and the second offsets, respectively.

The BS may not transmit a power offset, when transmitting initial power control information to the UE. Rather, The BS may transmit a power offset as independent power adjustment information to the UE, when power adjustment is needed later. Until before the UE receives the power offset, it calculates power by setting Offset to '0' in [Equation 4].

In the case of separate signaling of the first and second offsets, if the wireless communication system or the environment of a cell managed by the BS has been greatly changed, the BS transmits a relatively large power offset, namely the first offset $Offset_{Data}$ and/or $Offset_{Control}$ to the UE so that the UE adjusts its uplink transmission power of a data channel and/or a control channel. Whenever the wireless communication system or the environment of the cell managed by the BS has been slightly changed, the BS transmits a relatively small power offset, namely the second offset $\Delta_{PowerAdjust}$ to the UE so that the UE adjusts the uplink transmission power of the data channel and/or the control channel. In this manner, the UE can advantageously control its uplink transmission power more effectively against both slight and rapid changes in the wireless communication system and/or the cell environment.

With reference to FIGS. 1, 2 and 3, the embodiment illustrated in FIG. 5 will be described below.

In the BS 11, the processor 400b generates power control information including target SINR parameters, an uplink noise and interference level, and a UE-specific power offset and outputs the power control information to the transmitter 100b.

In the transmitter 100b, the encoder 110 encodes the power control information to coded data in a predetermined coding scheme, maps the coded data to symbols, and defines layers for the modulation symbols. The precoder 120 precodes the symbols received from the encoder 110 and outputs the precoded symbols as antenna-specific symbols to the subcarrier mappers 130-1 to 130-K. The subcarrier mappers 130-1 to 130-K map the antenna-specific symbols to appropriate subcarriers and multiplex the mapped symbols according to users. The OFDM signal generators 140-1 to 140-K modulate the multiplexed antenna-specific symbols in OFDM and output the resulting OFDM symbols to the antenna 500b, that is, the transmission antennas 500-1 to 500-$N_t$. The transmission antennas 500-1 to 500-$N_t$ may broadcast an OFDM symbol carrying the target SINR parameters and an OFDM symbol carrying the uplink noise and interference level and may unicast an OFDM symbol carrying the UE-specific power offset to the particular UE 12 in steps S210, S220 and S230. The components of the transmitter 100b and the operation of the antenna 500b are controlled by the controller 400b of the BS 11.

In the UE 12, the antenna 500a outputs the OFDM symbol signals received from the BS 11 to the receiver 300a. The receiver 300a recovers the data stream of the power control information transmitted by the BS 11 by decoding, demodulating and multiplexing the OFDM symbol signals and outputs the recovered power control information to the processor 400a. The processor 400a may calculate the gain and path loss of the antenna 500a, that is, the transmission antennas 500-1 to 500-$N_t$ and thus may estimate a current downlink propagation loss, L including the transmission antenna gain and path loss. Also, the processor 400a determines a target SINR using the target SINR parameters in step S240. The processor 400a may calculate an estimated average power level (dBm) of noise and interference, NI using the uplink noise and interference level. The processor 400a may determine an uplink power using the target SINR, NI, L, and the power offset received from the BS by [Equation 4] in step S250.

In the mean time, the processor 400b of the BS 11 may set a data channel power offset $Offset_{Data}$ and a control channel power offset $Offset_{Control}$, separately as illustrated in Table 1 and generate power adjustment information including both or either of the data channel and control channel power offsets.

The processor 400b may transmit the data channel power offset $Offset_{Data}$ and/or the control channel power offset $Offset_{Control}$ to the UE by controlling the transmitter 100b and the antenna 500b.

Specifically, the processor 400b of the BS 11 may set the data channel power offset as a first offset $Offset_{Data}$ and/or a second offset $\Delta_{PowerAdjust}$ according to [Equation 6] and may set the control channel power offset as a first offset $Offset_{Control}$ and/or a second offset $\Delta_{PowerAdjust}$ according to [Equation 7]. The processor 400b may control the transmitter 100b and the antenna 500b to transmit the first offset for the data channel or the control channel $Offset_{Data}$ or $Offset_{Control}$ and the second offset $\Delta_{PowerAdjust}$, together or separately. The processor 400b may also control the transmitter 100b and the antenna 500b to transmit only one of the first offset for the data channel or the control channel $Offset_{Data}$ or $Offset_{Control}$ and the second offset $\Delta_{PowerAdjust}$. For example, if the wireless communication system or the data/control channel transmission environment of the cell has been greatly changed, the processor 400b determines the first offset $Offset_{Data}$ and/or $Offset_{Control}$ according to the change of the transmission environment and controls the transmitter 100b and the antenna 500b to transmit the first offset $Offset_{Data}$ and/or $Offset_{Control}$ to the UE 12. For instance, the processor 400b sets the first offset to a value ranging from '−X1 (dB)' smaller than −0.5 dB and 'X2 (dB)' larger than '1.0 dB'. For example, the processor 400b may set the first offset be a value ranging from '−15.5 dB' to '16 dB' with a quantization interval of 0.5 dB and thus may control the transmitter 100b and the antenna 500b to transmit the first offset to the UE 12. On the other hand, if the wireless communication system or the environment of the cell managed by the BS has been slightly changed and the uplink transmission power needs fine adjustment, the processor 400b sets the second offset $\Delta_{PowerAdjust}$ to one of the values listed in Table 2 and controls the transmitter 100b and the antenna 500b to transmit the second offset $\Delta_{PowerAdjust}$ to the UE 12.

The UE 12 receives an OFDM symbol signal carrying the first offset and/or an OFDM symbol signal carrying the second offset through the antenna 500a. The receiver 300a recovers a signal stream of the original information from the received OFDM symbol signal. The processor 400a reflects the first and/or second offset in determining or adjusting the uplink power and controls the transmitter 100a and the antenna 500a to transmit a data channel signal or a control channel signal at the determined or adjusted power level in step S260.

Figure 6:
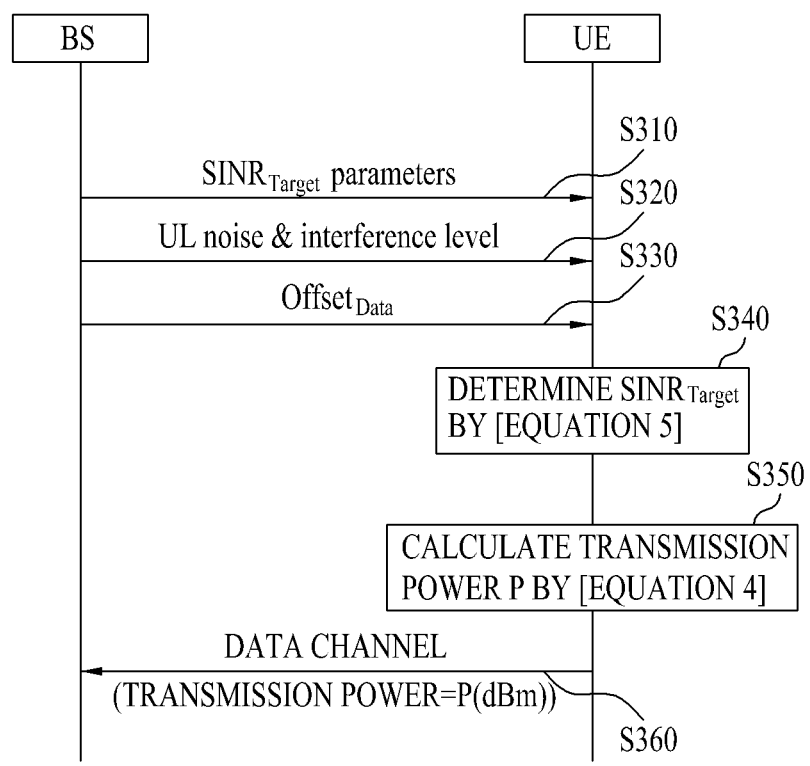
FIG. 6 is a flowchart illustrating a method for controlling the uplink power of a data channel according to an embodiment of the present invention.
Figure 7:
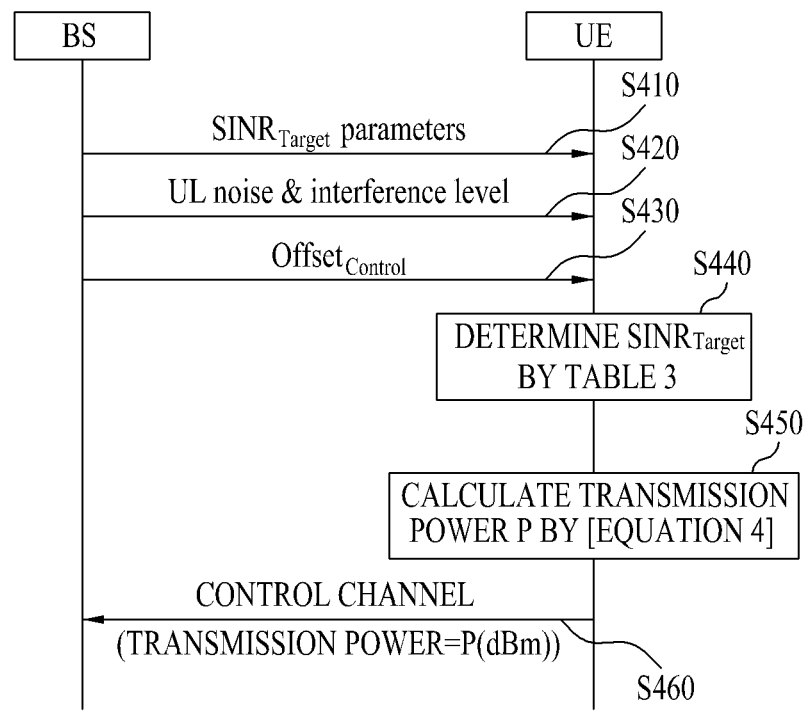
FIG. 7 is a flowchart illustrating a method for controlling the uplink power of a control channel according to an embodiment of the present invention.

Uplink transmission power may be determined for the data channel and the control channel in different manners, taking into account different channel characteristics of the data channel and the control channel. With reference to FIGS. 6 and 7, a method for controlling the uplink power of a data channel and a method for controlling the uplink power of a control channel will be described separately below.

FIG. 6 is a diagram illustrating a signal flow for a method for controlling the uplink power of a data channel according to an embodiment of the present invention.

Referring to FIG. 6, the BS transmits to the UE power control information including target SINR parameters for transmission of a data channel, such as $SINR_{MIN}$, $\gamma_{IoT}$, $\alpha$ and $\beta$, an uplink noise and interference level, and a UE-specific data channel power offset, $Offset_{Data}$ in steps S310, S320 and S330. In step S340, the UE determines the target SINR according to [Equation 5] using the target SINR parameters including $SINR_{MIN}$, $\gamma_{IoT}$, $\alpha$ and $\beta$ and a ratio of a downlink signal to interference power, $SIR_{DL}$. The UE then calculates an estimated average power level of noise and interference, NI using IoT indicating the uplink noise and interference level and calculates a current downlink propagation loss, L. The UE calculates an uplink power P using the target SINR, the estimated average power level of noise and interference, NI, the current downlink propagation loss L, and the data channel power offset Offset$_{Data}$ in step S350 and transmits the data channel with the transmission power P in step S360.

Meanwhile, the BS may transmit a UE-specific data channel power offset in the form of independent power adjustment information to the UE, when uplink power needs adjustment later, rather than it transmits a UE-specific data channel power offset in initial power control information to the UE. In this case, until before the UE receives the power adjustment information, it may calculate its uplink power by setting Offset to '0' in [Equation 4].

As described before with reference to FIG. 5, the UE-specific data channel power offset Offset$_{Data}$ may include a first offset and/or a second offset. When it is necessary to greatly change the transmission power P of the UE, the BS may signal the first offset to the UE. On the other hand, if the transmission power P does not need a great change, the BS may signal the second offset to the UE. It is also possible to set the UE-specific data channel power offset to include both the first and second offsets and transmit the UE-specific data channel power offset to the UE.

With reference to FIGS. 1, 2 and 3, the embodiment illustrated in FIG. 6 will be described below.

In the BS 11, the processor 400b sets target SINR parameters SINR$_{MIN}$, $\gamma_{IoT}$, $\alpha$ and $\beta$, sets an uplink interference and noise level, taking into account the interference and noise level of a signal in the wireless communication system, sets a UE-specific data channel power offset Offset$_{Data}$, taking into account a change in the data channel environment of the wireless communication system, and outputs the power control information to the transmitter 100b. In case of initial power control information, the processor 400b may set the UE-specific data channel power offset Offset$_{Data}$ to '0'.

In the transmitter 100b, the encoder 110 encodes the power control information to coded data in a predetermined coding scheme, maps the coded data to symbols, and defines layers for the symbols. The precoder 120 precodes the symbols received from the encoder 110 and outputs the precoded symbols as antenna-specific symbols to the subcarrier mappers 130-1 to 130-K. The subcarrier mappers 130-1 to 130-K map the antenna-specific symbols to appropriate subcarriers and multiplex the mapped symbols according to users. The OFDM signal generators 140-1 to 140-K modulate the multiplexed antenna-specific symbols in OFDM and output the resulting OFDM symbols to the antenna 500b, that is, the transmission antennas 500-1 to 500-N$_t$. The OFDM symbols may be broadcast or unicast to the particular UE 12 through the antenna 500b. For example, the processor 400b may control the transmitter 100b and the antenna 500b to broadcast an OFDM symbol carrying the target SINR parameters and an OFDM symbol carrying the uplink noise and interference level to UEs within the coverage area of the BS, and the processor 400b may control the transmitter 100b and the antenna 500b to unicast an OFDM symbol carrying the UE-specific data channel power offset to the UE 12 in steps S310, S320 and S330. The components of the transmitter 100b and the operation of the antenna 500b are controlled by the controller 400b of the BS 11.

In the UE 12, the antenna 500a outputs the OFDM symbol signals received from the BS 11 to the receiver 300a. The receiver 300a recovers the data stream of the power control information transmitted by the BS 11 by decoding, demodulating, and multiplexing the OFDM symbol signals. The processor 400a may calculate the gain and path loss of the antenna 500a, that is, the transmission antennas 500-1 to 500-N$_t$ and estimate a downlink propagation loss L including the transmission antenna gain and path loss. Also, the processor 400a determines a target SINR using the target SINR parameters by [Equation 5] in step S340. The processor 400a may calculate an estimated average power level NI using the uplink noise and interference level. The processor 400a may determine an uplink power using the target SINR, NI, L, and the UE-specific data channel power offset received from the BS by [Equation 4] in step S350. The processor 400a controls the transmitter 100a and the antenna 500a to transmit the data channel with the determined transmission power in step S360.

In the mean time, when the SINR of the data channel received from the UE 12 is beyond an error range of the target SINR or the data channel environment has changed, the processor 400b of the BS 11 determines a new data channel power offset, taking into account the change of the data channel environment. The processor 400b may set a data channel power offset Offset$_{Data}$ as a first offset Offset$_{Data}$ and/or a second offset $\Delta_{PowerAdjust}$ according to [Equation 6]. The processor 400b may control the transmitter 100b and the antenna 500b to transmit the first offset Offset$_{Data}$ and the second offset $\Delta_{PowerAdjust}$ for the data channel, together or separately. The processor 400b may generate the UE-specific data channel power offset Offset$_{Data}$ as new power control information and transmit the UE-specific data channel power offset Offset$_{Data}$ along with target SINR parameters and an uplink noise and interference level by controlling the transmitter 100b and the antenna 500b. Or the processor 400b may generate the UE-specific data channel power offset Offset$_{Data}$ as independent power adjustment information and transmit the power adjustment information to the UE 12 by controlling the transmitter 100b and the antenna 500b. It is also possible for the processor 400b to set only one of the first offset Offset$_{Data}$ and the second offset $\Delta_{PowerAdjust}$ and control the transmitter 100b and the antenna 500b to transmit the first offset Offset$_{Data}$ or the second offset $\Delta_{PowerAdjust}$ to the UE 12.

The UE 12 receives an OFDM symbol signal carrying the first offset Offset$_{Data}$ and/or an OFDM symbol signal carrying the second offset $\Delta_{PowerAdjust}$ through the antenna 500a. The receiver 300a recovers a signal stream of the original information from the received OFDM symbol signal. The processor 400a increases or decreases the uplink power of the data channel by the first offset Offset$_{Data}$ and/or the second offset $\Delta_{PowerAdjust}$ and controls the transmitter 100a and the antenna 500a to transmit subcarriers or streams on the data channel at the adjusted power level in step S360.

FIG. 7 is a diagram illustrating a signal flow for a method for controlling the uplink power of a control channel according to an embodiment of the present invention.

Referring to FIG. 7, the BS transmits to the UE power control information including target SINR parameters for channel transmission, an uplink noise and interference level, and a UE-specific control channel power offset, Offset$_{Control}$ in steps S410, S420 and S430. As the target SINR parameters, the BS may determine target SINRs for control channel types, illustrated in Table 3 or Table 4, and transmit the parameters of Table 3 or Table 4 to the UE.

TABLE 3

| Control Channel Type | SINR$_{Target}$ Parameters |
|---|---|
| HARQ Feedback | SINR_Target_HARQ |
| Synchronized Ranging | SINR_Target_SyncRanging |

TABLE 3-continued

| Control Channel Type | SINR$_{Target}$ Parameters |
| --- | --- |
| P-FBCH | SINR_Target_PFBCH |
| S-FBCH | SINR_Target_SFBCH_Base |
|  | SINR_Target_SFBCH_Delta |
| Bandwidth Request | SINR_Target_BWRequest |

TABLE 4

| Control Channel Type | SINRTarget Parameters |
| --- | --- |
| ACK/NAK | SINR_Target_ACKNAK |
| CQI | SINR_Target_CQI |
| Ranging code | SINR_Target_RC |
| P-FBCH | SINR_Target_PFBCH |
| S_FBCH | SINR_Target_SFBCH |
| Bandwidth Request | SINR_Target_BWRequest |

The UE determines a target SINR for a control channel according to the type of the control channel, referring to the parameters illustrated in Table 3 or Table 4 received as the power control information in step S440. For example, if the power control information includes the parameters of Table 3 and the UE intends to transmit an "HARQ Feedback" channel as a control channel, the UE sets the target SINR, SINR$_{Target}$ to 'SINR_Target_HARQ' illustrated in Table 3 in [Equation 4]. In step S450, the UE calculates the uplink power P of the control channel using the target SINR, a downlink propagation loss L estimated by the UE, an estimated average power level of noise and interference NI calculated based on the uplink noise and interference level received from the BS, and the UE-specific control channel power offset Offset$_{control}$ by [Equation 4]. Then the UE transmits subcarriers or streams of the control channel with the transmission power P in step S460.

Meanwhile, the BS may transmit a UE-specific control channel power offset in the form of independent power adjustment information to the UE, when uplink power needs adjustment later, rather than it transmits a UE-specific control channel power offset in initial power control information to the UE. When the UE-specific control channel power offset is not included in the initial power control information, the UE calculates its uplink power for a control channel by setting Offset to '0' in [Equation 4]. Upon receipt of a UE-specific control channel power offset later, the UE then changes its transmission power P for the control channel by setting Offset to the received UE-specific control channel power offset in [Equation 4].

As described before with reference to FIG. 5, the UE-specific control channel power offset Offset$_{control}$ may include a first offset Offset$_{control}$ and/or a second offset $\Box_{PowerAdjust}$. When it is necessary to greatly change the transmission power P of the UE, the BS may signal the first offset Offset$_{Control}$ to the UE. On the other hand, if the transmission power P does not need a great change, the BS may signal the second offset $\Box_{PowerAdjust}$ to the UE. It is also possible to signal both the first and second offsets Offset$_{Control}$ and $\Box_{PowerAdjust}$ to the UE.

With reference to FIGS. 1, 2 and 3, the embodiment illustrated in FIG. 7 will be described below.

In the BS 11, the processor 400b determines the parameters illustrated in Table 3 or Table 4 for use in determining a target SINR, SINR$_{Target}$ at the UE, sets an uplink interference and noise level, taking into account noise and interference in the wireless communication system, sets a UE-specific control channel power offset Offset$_{Control}$, taking into account a change in the control channel environment of the wireless communication system, and outputs the power control information to the transmitter 100b. In case of initial power control information, the processor 400b may set the UE-specific control channel power offset Offset$_{Control}$ to '0'.

In the transmitter 100b, the encoder 110 encodes the power control information to coded data in a predetermined coding scheme, maps the coded data to symbols, and defines layers for the symbols. The precoder 120 precodes the symbols received from the encoder and outputs the precoded symbols as antenna-specific symbols to the subcarrier mappers 130-1 to 130-K. The subcarrier mappers 130-1 to 130-K map the antenna-specific symbols to appropriate subcarriers and multiplex the mapped symbols according to users. The OFDM signal generators 140-1 to 140-K modulate the multiplexed antenna-specific symbols in OFDM and output the resulting OFDM symbols to the antenna 500b, that is, the transmission antennas 500-1 to 500-N$_t$. The OFDM symbols may be broadcast or unicast to the particular UE 12 through the antenna 500b. For example, the processor 400b may control the transmitter 100b and the antenna 500b to broadcast an OFDM symbol carrying the target SINR parameters and an OFDM symbol carrying the uplink noise and interference level to UEs within the coverage area of the BS, and the processor 400b may control the transmitter 100b and the antenna 500b to unicast an OFDM symbol carrying the UE-specific control channel power offset Offset$_{Control}$ to the UE 12 in steps S410, S420 and S430. The components of the transmitter 100b and the operation of the antenna 500b are controlled by the controller 400b of the BS 11.

In the UE 12, the antenna 500a outputs the OFDM symbol signals received from the BS 11 to the receiver 300a. The receiver 300a recovers the data stream of the power control information transmitted by the BS 11 by decoding, demodulating, and multiplexing the OFDM symbol signals. The processor 400a may calculate the gain and path loss of the antenna 500a, that is, the transmission antennas 500-1 to 500-N$_t$ and estimate a downlink propagation loss L including the transmission antenna gain and path loss. Also, the processor 400a determines a target SINR for a control channel using the parameters illustrated in Table 3, received from the BS in step S440. The processor 400a may calculate an estimated average power level of noise and interference per subcarrier NI of the UE 12 using the uplink noise and interference level, IoT by [Equation 2]. The processor 400a may determine an uplink power using the target SINR, the estimated average power level of noise and interference per noise NI, the downlink propagation loss L, and the UE-specific control channel power offset Offset$_{Control}$ received from the BS by [Equation 4] in step S450. The processor 400a controls the transmitter 100a and the antenna 500a to transmit the control channel with the determined transmission power in step S460.

In the mean time, when the SINR of the control channel received from the UE 12 is beyond an error range of the target SINR or the control channel environment has changed, the processor 400b of the BS 11 determines a control channel power offset, taking into account the difference between the SINR of the received signal and the target SINR or the change of the control channel environment. The processor 400b may set the control channel power offset Offset$_{Control}$ as a first offset Offset$_{Control}$ and/or a second offset $\Delta_{PowerAdjust}$ according to [Equation 7]. The processor 400b may control the transmitter 100b and the antenna 500b to transmit the first offset Offset$_{Control}$ and the second offset $\Delta_{PowerAdjust}$ for the control channel, together or separately. The processor 400b may generate new power control information including the UE-specific control channel power offset Offset$_{control}$ and transmit the UE-specific control channel power offset Offset$_{Control}$ along with target SINR parameters and/or an uplink noise and interference level to the UE by controlling the transmitter 100b and the antenna 500b. Or the processor 400b may generate the UE-specific control channel power offset Offset$_{Control}$ as independent power adjustment information and transmit the power adjustment information independently of the target SINR parameters and the uplink noise and interference level to the UE 12 by controlling the transmitter 100b and the antenna 500b. It is also possible for the processor 400b to generate power adjustment information including only one of the first offset Offset$_{Control}$ and the second offset $\Delta_{PowerAdjust}$ and control the transmitter 100n and the antenna 500b to transmit the power adjustment information to the UE 12.

The UE 12 receives an OFDM symbol signal carrying the first offset Offset$_{Control}$ and/or an OFDM symbol carrying the second offset $\square_{PowerAdjust}$ through the antenna 500a. The receiver 300a recovers a signal stream of the original information from the received OFDM symbol signal. The processor 400a increases or decreases the uplink power of the control channel by the first offset Offset$_{Control}$ and/or the second offset $\square_{PowerAdjust}$ received from the BS 11 and controls the transmitter 100a and the antenna 500a to transmit the control channel at the increased or decreased power level.

In accordance with the embodiments of the present invention illustrated in FIGS. 5, 6 and 7, there is no need for taking into account all of modes, the types of data and/or control information, and the types of data channels and/or control channels. Specifically, the BS determines parameters required to calculate [Equation 4] and target SINRs for only the control channel types illustrated in Table 3 or Table 4 and transmits the parameters and target SINRs to the UE. Then the UE uses the received target SINRs for the control channel types illustrated in Table 3 or Table 4 and determines target SINRs for the other channels by [Equation 5]. Therefore, the UE can determine its uplink power easily in accordance with the embodiments of the present invention illustrated in FIGS. 5, 6 and 7, compared to the uplink power control method illustrated in FIG. 4 in which uplink power is controlled according to a mode and particularly in Mode 2, a C/N is determined according to the type of a data channel and/or a control channel.

Figure 8:
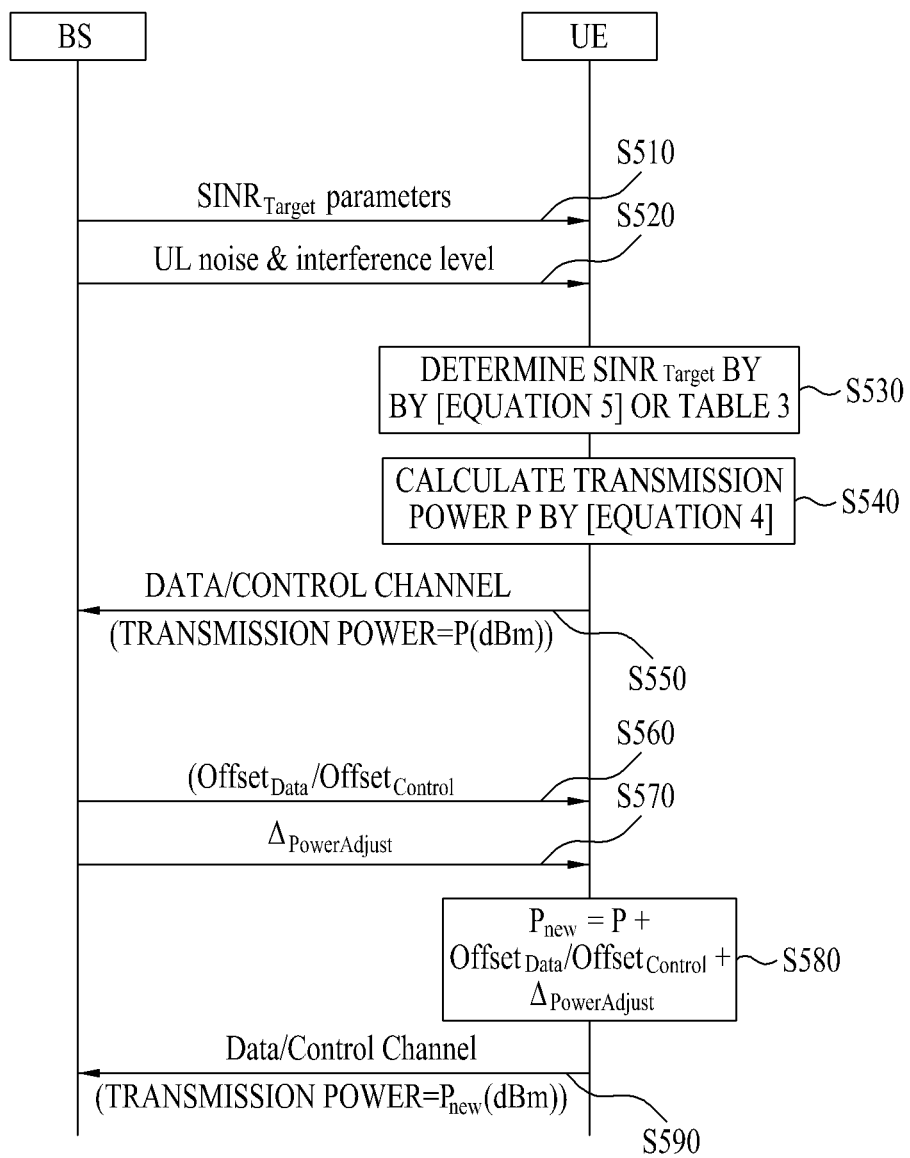
FIG. 8 is a diagram illustrating a signal flow for a method for adjusting uplink power according to an embodiment of the present invention.

FIG. 8 is a diagram illustrating a signal flow for a method for adjusting uplink power according to an embodiment of the present invention.

As described before with reference to FIGS. 5, 6 and 7, a UE-specific power offset for a data channel and/or a control channel may be transmitted to the UE, separately from target SINR parameters and an uplink noise and interference level. FIG. 8 describes a case in which a UE-specific power offset is transmitted to the UE independently of target SINR parameters and an uplink noise and interference level, for use in adjusting uplink power.

Referring to FIG. 8, the BS transmits target SINR parameters for transmission of a data channel and/or a control channel, and an uplink noise and interference level to the UE in steps S510 and S520. For example, the BS transmits to the UE target SINR parameters such as SINR$_{MIN}$, $\gamma_{IoT}$, $\alpha$ and $\beta$, for use in determining a target SINR for a data channel at the UE, and the parameters illustrated in Table 3 or Table 4, for use in determining a target SINR for a control channel at the UE. The target SINR parameters for the data channel and the target SINR parameters for the control channel may be transmitted to the UE by one control message or separate control messages.

In step S530, the UE determines a target SINR using the target SINR parameters. Specifically, the UE may determine a target SINR for the data channel according to [Equation 5] using the target SINR parameters SINR$_{MIN}$, $\gamma_{IoT}$, $\alpha$ and $\beta$ and a ratio of a downlink signal to interference power, SIR$_{DL}$ and determine a target SINR for the control channel using the parameters listed in Table 3 or Table 4, received from the BS, if the control channel is of a type indicated by Table 3 or Table 4.

The UE calculates an estimated average power level (dBm) of noise and interference per subcarrier, NI using the uplink noise and interference level received from the BS. In step S540, the UE calculates an uplink power P per subcarrier and stream using the target SINR, the estimated average power level (dBm) of noise and interference per subcarrier, NI, and a current downlink propagation loss L estimated by the UE, according to [Equation 4]. The UE calculates the uplink power P by setting Offset to '0' in [Equation 4] until before it receives an actual offset value.

In step S550, the UE transmits subcarriers or streams of the data channel and/or the control channel with the transmission power P.

If the SINR of subcarriers or streams received from the UE is beyond an error range of the target SINR or the channel environment of the wireless communication system has been changed, which means that the uplink transmission power P of the UE needs adjustment, the BS transmits a power offset to the UE, for adjusting the transmission power P in steps S560 and S570. As described before with reference to FIGS. 5, 6 and 7, power offsets may be determined separately for the data channel and the control channel. Each of a data channel power offset Offset$_{Data}$ and a control channel power offset Offset$_{Control}$ may be transmitted as a first offset Offset$_{Data}$ or Offset$_{Control}$ and/or a second offset $\Delta_{PowerAdjust}$ to the UE. The first offset Offset$_{Data}$ or Offset$_{Control}$ and the second offset $\Delta_{PowerAdjust}$ may be configured as independent information and transmitted separately to the UE. For example, the first offset Offset$_{Data}$ or Offset$_{Control}$ may be transmitted as first-type power adjustment information set to a value ranging from −15.5 dB to 16 dB with a quantization interval of 0.5 dB, and the second offset $\Delta_{PowerAdjust}$ may be transmitted to the UE as second-type power adjustment information set to one of −0.5 dB, 0.0 dB, 0.5 dB, and 1.0 dB. In IEEE 802.16m, for instance, the first offset may be transmitted to the UE by an AAI_UL_POWER_ADJUST message and the second offset may be transmitted to the UE by a PC-A-MAP.

Upon receipt of the power adjustment information from the BS, the UE determines a new uplink power P$_{new}$ by adjusting the old uplink power P by the power offset included in the power adjustment information in step S580 and transmits subcarriers, streams, or subcarriers per stream on the data channel and/or control channel with the new uplink power P$_{new}$ in step S590.

i. With reference to FIGS. 1, 2 and 3, the embodiment illustrated in FIG. 8 will be described below.

In the BS 11, the processor 400b transmits target SINR parameters SINR$_{MIN}$, $\gamma_{IoT}$, $\alpha$ and $\beta$, the parameters illustrated in Table 3 or Table 4, and an uplink interference and noise level to the transmitter 100b in steps S510 and S520. The processor 400b may generate a control message including the target SINR parameters and a control message including the uplink noise and interference level at every predetermined period and thus may control the transmitter 100b and the antenna 500b to transmit the control messages to the UE 12.

To be more specific, in the transmitter 100b, the encoder 110 encodes the control messages to coded data in a predetermined coding scheme, maps the coded data to symbols, and defines layers for the symbols. The precoder 120 precodes the symbols received from the encoder 110 and outputs the precoded symbols as antenna-specific symbols to the subcarrier mappers 130-1 to 130-K. The subcarrier mappers 130-1 to 130-K map the antenna-specific symbols to appropriate subcarriers and multiplex the mapped symbols according to users. The OFDM signal generators 140-1 to 140-K modulate the multiplexed antenna-specific symbols in OFDM and output the resulting OFDM symbols to the antenna 500b, that is, the transmission antennas 500-1 to 500-N$_t$. The processor 400b controls the antenna 500b to broadcast an OFDM symbol carrying the target SINR parameters and an OFDM symbol carrying the uplink noise and interference level.

In the UE 12, the antenna 500a outputs the OFDM symbol signals received from the BS 11 to the receiver 300a. The receiver 300a recovers the data stream of the power control information transmitted by the BS 11 by decoding, demodulating, and multiplexing the OFDM symbol signals. The processor 400a may calculate the gain and path loss of the antenna 500a, that is, the transmission antennas 500-1 to 500-N$_t$ and estimate a downlink propagation loss L including the transmission antenna gain and path loss.

Also, the processor 400a may determine a target SINR for any control channel type indicated by Table 3 or Table 4 based on the parameters of Table 3 or Table 4 received from the BS, and may determine according to [Equation 5] a target SINR for a channel type that is not indicated by Table 3 or Table 4 based on the target SINR parameters $SINR_{MIN}$, $\gamma_{IoT}$, $\alpha$ and $\beta$, and a ratio of a downlink signal to interference power, $SIR_{DL}$ in step S530. The processor 400a may calculate an estimated average power level of noise and interference per subcarrier of the UE 12, NI, using the uplink noise and interference level.

The processor 400a may determine an uplink power P for each of the data channel and the control channel, using the target SINR, the estimated average power level of noise and interference per subcarrier of the UE 12, NI, the current downlink propagation loss L calculated by the processor 400a, and Offset set to '0' by [Equation 4] in step S540. The processor 400a controls the transmitter 100a and the antenna 500a to transmit subcarriers or streams of the data channel and/or the control channel with the uplink power P.

In the mean time, when the SINR of the subcarriers or streams received from the UE 12 is beyond an error range of the target SINR or the channel environment of the wireless communication system has changed, the processor 400b of the BS 11 determines a UE-specific power offset, taking into account the difference between the SINR of the received signal and the target SINR or the change of the channel environment, and transmits the UE-specific power offset to the UE 12 in steps S560 and S570. The processor 400b may set power offsets separately for the data channel and the control channel. Each of a data channel power offset $Offset_{Data}$ and a control channel power offset $Offset_{Control}$ may be transmitted as a first offset $Offset_{Data}$ or $Offset_{Control}$ and/or a second offset $\Delta_{PowerAdjust}$ to the UE. The processor 400b may also configure the first offset $Offset_{Data}$ or $Offset_{Control}$ and the second offset $\Delta_{PowerAdjust}$ as independent information and transmit them separately to the UE by controlling the transmitter 100b and the antenna 500b. For example, when uplink power needs to be greatly adjusted, the first offset $Offset_{Data}$ or $Offset_{Control}$ may be transmitted as first-type power adjustment information to the UE in step S560. If a slight power adjustment is needed, second-type power adjustment information may be configured to include the second offset $\Delta_{PowerAdjust}$ set to one of −0.5 dB, 0.0 dB, 0.5 dB, and 1.0 dB and transmitted to the UE 12 in step S570. In IEEE 802.16m, for instance, the first offset may be transmitted to the UE by an AAI_UL_POWER_ADJUST message and the second offset may be transmitted to the UE by a PC-A-MAP. The processor 400b of the BS 11 may generate the first-type power adjustment information and the second-type power adjustment information and transmit them to the UE 12 at every predetermined period or when needed. It is possible to generate and signal the first-type power adjustment information to the UE in a relatively long period and to generate and signal the second-type power adjustment information to the UE in a relatively short period.

In the UE 12, the antenna 500a receives an OFDM symbol signal carrying the first offset and/or an OFDM symbol signal carrying the second offset from the BS 11. The receiver 300b recovers a data stream of the original power adjustment information and outputs the recovered power adjustment information to the processor 400a. The processor 400a determines a new uplink power $P_{new}$ by adjusting the old uplink power P by the first power offset $Offset_{Data}$ or $Offset_{Control}$ and the second offset $\Delta_{PowerAdjust}$ received from the BS 11 in step S580 and controls the transmitter 100a and the antenna 500a to transmit subcarriers or streams with the new uplink power $P_{new}$ in step S590. When the old uplink power P is adjusted, it is also possible to determine the new uplink power $P_{new}$ by setting Offset to the first offset indicated by the first-type power adjustment information and/or the second offset indicated by the second-type power adjustment information in [Equation 4].

In the embodiments of the present invention illustrated in FIGS. 5 to 8, the BS transmits an uplink noise and interference level, IoT to the UE and the UE calculates an estimated average power level of noise and interference per subcarrier of the UE using the uplink noise and interference level, IoT, as described before with reference to FIG. 4. Instead of the IoT value, the BS may transmit the NI value directly to the UE.

In the embodiments of the present invention illustrated in FIGS. 5 to 8, meanwhile, the BS may transmit target SINR parameters and an uplink noise and interference level, IoT to the UE by a MAC message used for a control function according to a peer-to-peer protocol of the MAC layers of the BS and the UE. For example, a target SINR may be broadcast by a system configuration information message used for system configuration of UEs within the coverage area of the BS, and the uplink noise and interference level IoT may be broadcast by an uplink noise and interference level message specifying an uplink noise and interference level of UEs within the coverage area of the BS. In IEEE 802.16m, for instance, the target SINR may be broadcast by an Advanced Air Interface System Configuration Descriptor (AAI_SCD) message and the uplink nose and reference level may be broadcast by an Advanced Air Interface Uplink NI (AAI_ULPC_NI) message.

As stated before with reference to FIGS. 5 to 8, the BS may transmit to the UE a first offset as first-type power adjustment information and a second offset as second-type power adjustment information. Specifically, the first offset may be generated as an independent power adjustment message and unicast to the UE, while the second offset may be generated as independent power adjustment information and unicast to the UE. For example, in IEEE 802.16m, the first offset may be unicast to the UE by an AAI_UL_POWER_ADJUST message and the second offset may be unicast to the UE by a PC-A-MAP.

In the embodiments of the present invention illustrated in FIGS. 5 to 8 in which a UE-specific power offset is signaled as first and second offsets to the UE, when a rapid power adjustment is required, the BS may signal the first offset to the UE. When a slight power adjustment is needed, the BS may signal the second offset to the UE. The BS may differentiate signaling periods in transmitting the first and second offsets. Accordingly, the UE may control its uplink power more flexibly according to an environmental change in the wireless communication system.

Since there is no need for the UE to determine a power offset, the processor of the UE performs a simplified uplink power control process, thereby reducing the operation load of the UE.

Further, only a power offset that the BS has determined, taking into account the overall environment of the wireless communication system is reflected in adjusting the uplink power of the UE, with a UE-determined power offset excluded. Hence the wireless communication system avoids an environmental change that may be caused by an individual UE's independent power adjustment.

The present invention is applicable to a method for controlling transmission power to stably transmit data or control information to a BS in a wireless communication system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for determining an uplink power in a user equipment in a wireless communication system, the method comprising:

receiving a target Signal-to-Interference plus Noise Ratio (SINR) parameter and an uplink noise and interference level from a base station; and determining the uplink power for an uplink channel according to a following equation:

$$P(\text{dBm}) = L + SINR_{Target} + NI + \text{Offset},$$

where P denotes the uplink power, L denotes an estimated average downlink propagation loss, $SINR_{Target}$ denotes a target SINR determined using the target SINR parameter, NI denotes an estimated average power level of noise and interference at the base station, calculated using the uplink noise and interference level, and Offset is a correction term for power offset specific to the user equipment, wherein Offset is controlled by the base station, wherein $SINR_{Target}$ is determined using a following equation when the uplink channel is a data channel:

$$SINR_{Target} = $$
$$10\log10\left(\max\left(10^{\left(\frac{SINR_{MIN}(dB)}{10}\right)}, \gamma_{IoT} \times SIR_{DL} - \alpha\right)\right) - \beta \times 10\log10(TNS),$$

where $SINR_{MIN}$ denotes an SINR requirement for a minimum rate expected by the base station, $\gamma_{IoT}$ denotes a fairness and Interference plus noise over Thermal noise (IoT) control factor received from the base station, $SIR_{DL}$ denotes a ratio of a downlink signal to interference power, measured by the use equipment, α denotes a factor based on the number of reception antennas of the base station, and β denotes a stream factor indicating whether a Total Number of Streams (TNS) in a resource unit indicated by uplink MAP information is applied, and wherein $SINR_{Target}$ is determined based on a target SINR value for a control channel, received from the base station, when the uplink channel is the control channel.

2. The method according to claim 1, wherein Offset is controlled using at least one of a first offset received through an uplink power adjust message from the base station and a second offset received through a power control advanced MAP from the base station.

3. The method according to claim 2, wherein the first offset is a value ranging from −15.5 dB to 16 dB, and the second offset is one of −0.5 dB, 0.0 dB, 0.5 dB and 1.0 dB.

4. The method according to claim 2, wherein Offset is equal to the sum of the first offset and the second offset when the uplink channel is the control channel.

5. The method according to claim 1, wherein
the control channel is an ACKnowledgment/Negative ACKnowledgment (ACK/NACK) channel, a ranging channel, a Primary Fast Feedback CHannel (P-FBCH), a Secondary Fast Feedback CHannel (S-FBCH); or a bandwidth request channel.

6. An apparatus for determining an uplink power in a wireless communication system, the apparatus comprising:

a receiver; and a processor configured to control the receiver, wherein the receiver is configured to receive a target Signal-to-Interference plus Noise Ratio (SINR) parameter and an uplink noise and interference level from a base station, and the processor is configured to determine the uplink power for an uplink channel according to the following equation:

$$P(\text{dBm}) = L + SINR_{Target} + NI + \text{Offset},$$

where P denotes the uplink power, L denotes an estimated average downlink propagation loss, $SINR_{Target}$ denotes a target SINR determined using the target SINR parameter, NI denotes an estimated average power level of noise and interference at the base station, calculated using the uplink noise and interference level, and Offset is a correction term for power offset specific to the apparatus, wherein Offset is controlled by the base station, wherein $SINR_{Target}$ is determined using a following equation when the uplink channel is a data channel:

$$SINR_{Target} = $$
$$10\log10\left(\max\left(10^{\left(\frac{SINR_{MIN}(dB)}{10}\right)}, \gamma_{IoT} \times SIR_{DL} - \alpha\right)\right) - \beta \times 10\log10(TNS),$$

where $SINR_{MIN}$ denotes an SINR requirement for a minimum rate expected by the base station, $\gamma_{IoT}$ denotes a fairness and Interference plus noise over Thermal noise (IoT) control factor received from the base station, $SIR_{DL}$ denotes a ratio of a downlink signal to interference power, measured by the apparatus, α denotes a factor based on the number of reception antennas of the base station, and β denotes a stream factor indicating whether a Total Number of Streams (TNS) in a resource unit indicated by uplink MAP information is applied, and wherein $SINR_{Target}$ is determined based on a target SINR value for a control channel, received from the base station, when the uplink channel is the control channel.

7. The apparatus according to claim 6, wherein Offset is controlled using at least one of a first offset received through an uplink power adjust message from the base station and a second offset received through a power control advanced MAP from the base station.

8. The apparatus according to claim 7, wherein the first offset is a value ranging from −15.5 dB to 16 dB, and the second offset is one of −0.5 dB, 0.0 dB, 0.5 dB and 1.0 dB.

9. The apparatus according to claim 7, wherein Offset is equal to the sum of the first offset and the second offset when the uplink channel is the control channel.

10. The apparatus according to claim 6, wherein
the control channel is an ACKnowledgment/Negative ACKnowledgment (ACK/NACK) channel, a ranging channel, a Primary Fast Feedback CHannel (P-FBCH), a Secondary Fast Feedback CHannel (S-FBCH) or a bandwidth request channel.

11. A method for performing uplink power control in a wireless communication system, the method comprising:
broadcasting a target Signal-to-Interference plus Noise Ratio (SINR) parameters and an uplink noise and interference level; and
receiving, from a user equipment, an uplink channel transmitted by a user equipment at an uplink power according to a following equation:

$$P(\text{dBm}) = L + SINR_{Target} + NI + \text{Offset},$$

where P denotes the uplink power, L denotes an estimated average downlink propagation loss, $SINR_{Target}$ denotes a target SINR determined using the target SINR parameter, NI denotes an estimated average power level of noise and interference at the base station, calculated using the uplink noise and interference level, and Offset is a correction term for power offset specific to the user equipment,
wherein Offset is controlled by the base station,
wherein $SINR_{Target}$ is determined using a following equation when the uplink channel is a data channel:

$$SINR_{Target} = 10\log10\left(\max\left(10^{\left(\frac{SINR_{MIN}(dB)}{10}\right)}, \gamma_{IoT} \times SIR_{DL} - \alpha\right)\right) - \beta \times 10\log10(TNS),$$

where $SINR_{MIN}$ denotes an SINR requirement for a minimum rate expected by the base station, $\gamma_{IoT}$ denotes a fairness and Interference plus noise over Thermal noise (IoT) control factor transmitted by the base station, $SIR_{DL}$ denotes a ratio of a downlink signal to interference power, measured by the use equipment, α denotes a factor based on the number of reception antennas of the base station, and β denotes a stream factor indicating whether a Total Number of Streams (TNS) in a resource unit indicated by uplink MAP information is applied, and
wherein $SINR_{Target}$ is determined based on a target SINR value for a control channel, transmitted by the base station, when the uplink channel is the control channel.

12. The method according to claim 11, wherein Offset is controlled using at least one of the first offset unicast through an uplink power adjust message to the user equipment, and the second offset unicast through a power control advanced MAP to the user equipment.

13. The method according to claim 12, wherein the first offset is a value ranging from −15.5 dB to 16 dB, and the second offset is one of −0.5 dB, 0.0 dB, 0.5 dB and 1.0 dB.

14. The method according to claim 12, wherein Offset is equal to the sum of the first offset and the second offset when the uplink channel is the control channel.

15. The method according to claim 11, wherein the control channel is an ACKnowledgment/Negative ACKnowledgment (ACK/NACK) channel, a ranging channel, a Primary Fast Feedback CHannel (P-FBCH), a Secondary Fast Feedback CHannel (S-FBCH) or a bandwidth request channel.

16. An apparatus for performing uplink power control in a wireless communication system, the apparatus comprising:
a transmitter;
a receiver; and
a processor configured to control the transmitter to broadcast a target Signal-to-Interference plus Noise Ratio (SINR) parameters and an uplink noise and interference level, and control the receiver to receive an uplink channel transmitted by a user equipment at an uplink power according to a following equation:

$$P(\text{dBm}) = L + SINR_{Target} + NI + \text{Offset},$$

where P denotes the uplink power, L denotes an estimated average downlink propagation loss, $SINR_{Target}$ denotes a target SINR determined using the target SINR parameter, NI denotes an estimated average power level of noise and interference at the apparatus, calculated using the uplink noise and interference level, and Offset is a correction term for power offset specific to the user equipment,
wherein Offset is controlled by the apparatus,
wherein $SINR_{Target}$ is determined using a following equation when the uplink channel is a data channel:

$$SINR_{Target} = 10\log10\left(\max\left(10^{\left(\frac{SINR_{MIN}(dB)}{10}\right)}, \gamma_{IoT} \times SIR_{DL} - \alpha\right)\right) - \beta \times 10\log10(TNS),$$

where $SINR_{MIN}$ denotes an SINR requirement for a minimum rate expected by the apparatus, $\gamma_{IoT}$ denotes a fairness and Interference plus noise over Thermal noise (IoT) control factor transmitted by the apparatus, $SIR_{DL}$ denotes a ratio of a downlink signal to interference power, measured by the use equipment, α denotes a factor based on the number of reception antennas of the apparatus, and β denotes a stream factor indicating whether a Total Number of Streams (TNS) in a resource unit indicated by uplink MAP information is applied, and
wherein $SINR_{Target}$ is determined based on a target SINR value for a control channel, transmitted by the apparatus, when the uplink channel is the control channel.

17. The apparatus according to claim 16, wherein Offset is controlled using a first offset and a second offset, and wherein the processor is configured to control the transmitter to unicast the first offset through an uplink power adjust message to the user equipment and the second offset through a power control advanced MAP to the user equipment.

18. The apparatus according to claim 17, wherein the processor is configured to set the first offset to a value ranging from −15.5 dB to 16 dB, and to set the second offset to one of −0.5 dB, 0.0 dB, 0.5 dB and 1.0 dB.

19. The apparatus according to claim 17, wherein Offset is equal to the sum of the first offset and the second offset when the uplink channel is the control channel.

20. The apparatus according to claim 16, wherein the control channel is an ACKnowledgment/Negative ACKnowledgment (ACK/NACK) channel, a ranging channel, a Primary Fast Feedback CHannel (P-FBCH), a Secondary Fast Feedback CHannel (S-FBCH) or a bandwidth request channel.

* * * * *